United States Patent [19]

Christoff

[11] Patent Number: 4,617,683
[45] Date of Patent: Oct. 14, 1986

[54] RECLOSABLE BAG, MATERIAL, AND METHOD OF AND MEANS FOR MAKING SAME

[75] Inventor: Paul B. Christoff, Lisle, Ill.

[73] Assignee: Minigrip, Inc., Orangeburg, N.Y.

[21] Appl. No.: 574,878

[22] Filed: Jan. 30, 1984

[51] Int. Cl.⁴ .......................................... B65D 33/16
[52] U.S. Cl. ................................. 383/63; 383/65; 53/128; 53/416; 53/451; 53/551; 493/214; 493/302
[58] Field of Search .................... 383/63, 64, 65, 125; 24/339, 400, 587; 53/128, 416, 451, 551; 493/194, 214, 302

[56] References Cited

U.S. PATENT DOCUMENTS

| Re. 29,043 | 11/1976 | Naito | 156/244 |
|---|---|---|---|
| 3,338,285 | 8/1967 | Jaster | 383/65 |
| 3,405,861 | 10/1968 | Bush | 206/497 |
| 3,440,696 | 10/1965 | Staller | 24/201 |
| 3,449,888 | 9/1965 | Gausman | 53/182 |
| 3,532,571 | 10/1970 | Ausnit | 383/65 |
| 3,570,375 | 3/1971 | Williams | 493/214 |
| 3,608,439 | 9/1971 | Ausnit | 383/63 |
| 3,717,244 | 2/1973 | Smith | 53/451 |
| 3,789,888 | 2/1974 | James et al. | 141/4 |
| 3,827,472 | 8/1974 | Uramoto | 383/63 |
| 3,948,705 | 4/1976 | Ausnit | 156/73.4 |
| 4,020,884 | 5/1977 | Jadot | 24/587 |
| 4,046,408 | 9/1977 | Ausnit | 285/188 |
| 4,094,729 | 6/1978 | Boccia | 493/214 |
| 4,285,105 | 8/1981 | Kirkpatrick | 383/63 |
| 4,332,344 | 6/1982 | Strodthoff | 383/63 |
| 4,354,541 | 10/1982 | Tilman | 150/3 |
| 4,355,494 | 10/1982 | Tilman | 53/416 |
| 4,372,793 | 2/1983 | Herz | 156/66 |
| 4,479,244 | 10/1984 | Ausnit | 383/63 |

FOREIGN PATENT DOCUMENTS

| 1423849 | 11/1965 | France | 383/63 |
|---|---|---|---|
| 452430 | 5/1968 | Switzerland | 383/63 |

Primary Examiner—Joseph Man-Fu Moy
Assistant Examiner—David Fidei
Attorney, Agent, or Firm—Hill, Van Santen, Steadman & Simpson

[57] ABSTRACT

A reclosable bag, and material for making the bag, and wherein in one aspect extruded resiliently flexible plastic profiled reclosable fastener strip means for reclosable bags is located across the longitudinal formation axis of the bag wall web material, and in another aspect of the invention single strip fastener strip has at one or more suitable locations therealong separations across the profiles, such as notches, to facilitate bending or folding of the strip upon itself so that the self-interlocking profiles of the portions of the strip folded upon themselves are adapted for reclosable interlocking with one another. The interlockable portions of the strip may have separable air tight sealing ribs therealong. The web and fastener material and fastener assembly is especially suitable for machines wherein the bags are formed, filled and sealed.

11 Claims, 16 Drawing Figures

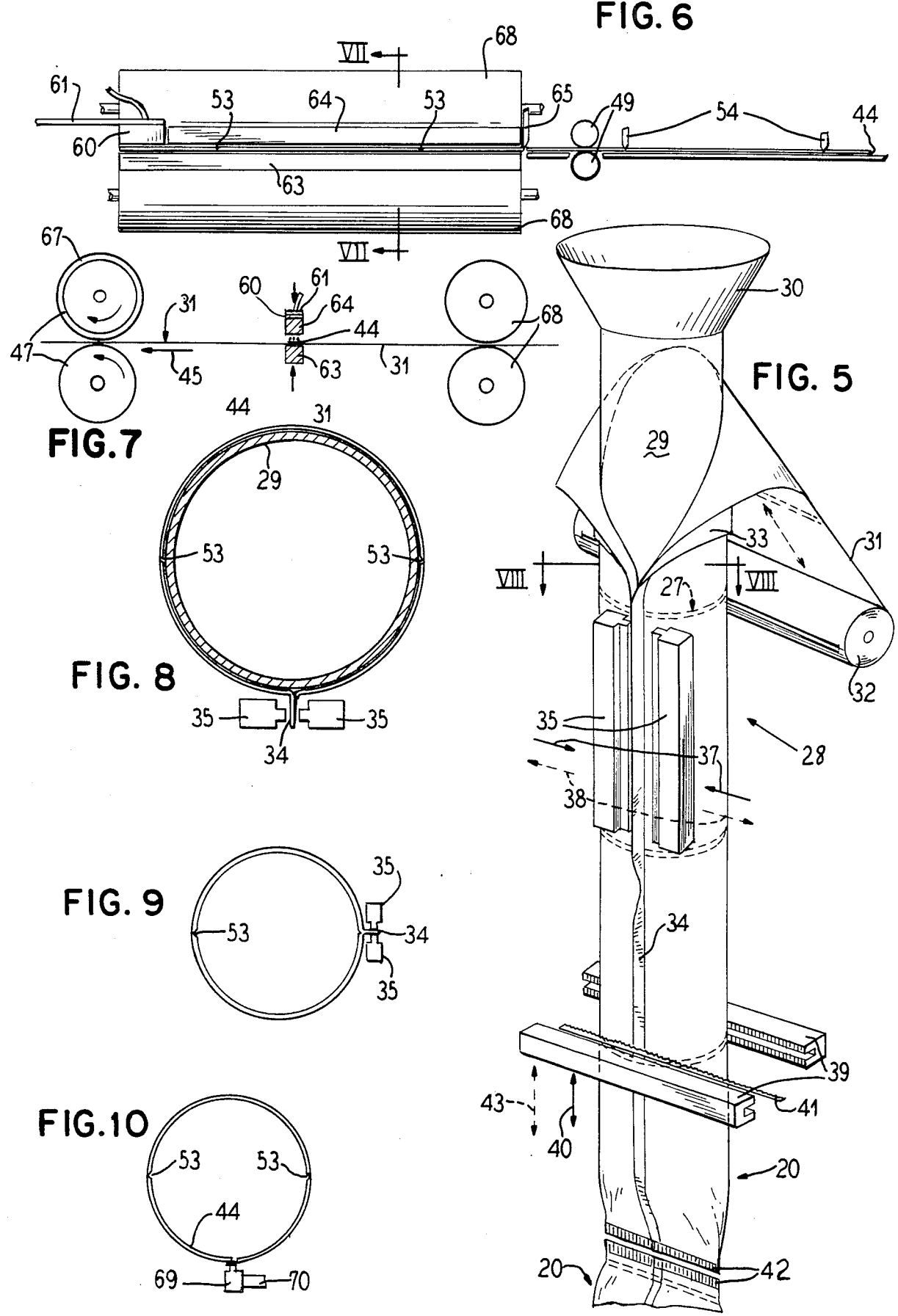

RECLOSABLE BAG, MATERIAL, AND METHOD OF AND MEANS FOR MAKING SAME

BACKGROUND OF THE INVENTION

This invention relates to the art of reclosable bags, the material for making such bags, and is more particularly concerned with bags of the kind provided with extruded resiliently flexible plastic profiled reclosable separable fastener means.

The art of making reclosable bags equipped with extruded plastic profiled reclosable separable fastener means has seen a long period of developement as reflected in numerous patent disclosures. It has been conventional practice to extrude plastic material in tubular or strip sheet or web form with the profiled separable fastener means coextruded along and parallel to the longitudinal formation axis of the web, that is, the direction in which the web is extruded. On the other hand, prefabricated separable fastener strip means have been secured to separately formed web and with the fastener strip means extending longitudinally parallel to the longitudinal formation axis of the web.

By way of example, U.S. Pat. No. Re. 29,043 is referred to as disclosing coextrusion of web and fastener means and forming the same into bag sections.

U.S. Pat. No. 3,948,705 exemplifies the technique of securing reclosable separable fastener strips to plastic film parallel to the longitudinal formation axis of the web by fusion or heat seal methods.

Attachment of separable fastener strips parallel to the longitudinal formation axis of the web by adhesive means is exemplified in U.S. Pat. Nos. 4,372,793; 4,354,541; and 4,355,494.

U.S. Pat. No. 4,046,408 discloses separably interlockable fasteners along the edges of the plastic sheet material having generally arrow shaped profiles, the fasteners being either integrally extruded with flat sheets or tubes of plastic film, or supplied in the form of extruded strips attached to the web or film by heat sealing.

According to all of those prior patent disclosures, it is necessary to provide at least a pair of spaced longitudinally extending complementary profile fastener strips along the longitudinal extent of the bag material web or film so that when the material is folded upon itself along one or more folds parallel to the separable fastener strips, the fastener profiles will be aligned with one another in interlockable relation and extend along the top or bag mouth edges of the bag sections into which the material is subdivided by sealing the same at spaced intervals across the length of the material to provide closed sides for the bag sections.

Where separate matching strips of the web or film material carrying the complementary profile fastener strips longitudinally along the longitudinal extent of the material are aligned in face-to-face relation to provide bag sidewalls, the same requirements must be met as described for the foldable material for fabricating the same into bag sections, except that all side and bottom edges of the bag walls must also be secured together in those completed bags.

Those prior techniques do not necessarily limit the length of bags to be produced thereby, that is, the length from the bag top end to the bottom end of the bag, unless the bags are supplied for filling by the type of filling machines commonly referred to as form, fill and seal machines, such as exemplified in U.S. Pat. No. 4,355,494.

Where the fastener strip means are located longitudinally along the length of the bag making web material, the length of the bags that can be produced in the form, fill and seal machines is limited to the diameter of the filling nozzle about which the film or web material is progressively wrapped. Further, unless the fastener profiles are interlocked before the bag forming material is wrapped about the forming extent of the filling nozzle or at least before the usual longitudinal sealing of the joined longitudinal edges or margins of the bag forming material, there is a considerable problem with attaining interlockable registration of the fastener profiles.

Furthermore, if and when used on vertical form, fill, and seal apparatus, bag material as shown in U.S. Pat. No. 4,355,494 has certain shortcomings, as the material will produce finished bags having reclosable fastener means running in the longitudinal formation direction of the material and, thus, in a vertical direction along the bags. Such bags may not be commercially acceptable for some products, e.g., some types of candies, potato chips, and other snack foods.

SUMMARY OF THE PRESENT INVENTION

By the present invention, the problems, disadvantages and shortcomings inherent in prior techniques are overcome especially as related to vertical form, fill and seal arrangements for making and filling bags, but also for bag making generally.

An important object of the present invention is to provide new and improved bags formed from film or other web material having thereon extruded reclosable plastic fastener means extending across the longitudinal formation axis of the web material.

A further object of the invention is to provide new and improved material adapted for making of reclosable bags having complementary profile extruded plastic fastener strips extending across the mouth ends of the bags.

Yet another object of the invention is to provide a new and improved reclosable fastener equipped bag material, especially for use with vertical form, fill, and seal machines so as to produce finished bags having reclosable fastener means running transversely with respect to the longitudinal formation direction of the material near the top ends of the bags.

Pursuant to the principles of the present invention there is provided a new and improved reclosable bag, and wherein the bag has a body with top and bottom ends and confronting walls, and the walls formed from web material having its longitudinal formation axis extending between the top and bottom ends of the bag body, and extruded resiliently flexible plastic profiled reclosable fastener means secured to the walls at the top end of the bag body and extending across the longitudinal formation axis of the web material.

There is also provided by the present invention new and improved material for making reclosable bags, comprising a web having a longitudinal formation axis and adapted for forming into a bag with the formation axis extending between a top end and a bottom end of the bag, and extruded resiliently flexible plastic profiled reclosable fastener strip means secured to the web across the formation axis of the web and adapted to be located across the top end of the bag into which the material is formed.

By this invention there is also provided material for and a bag made from the material, and wherein an elongated extruded resiliently flexible plastic profiled reclosable fastener strip is foldable upon itself into interlocking relation of the fastener profiles.

BRIEF DESCRIPTION OF THE DRAWINGS

Other objects, features and advantages of the present invention will be readily apparent from the following description of certain representative embodiments thereof, taken in conjunction with the accompanying drawings, although variations and modifications may be effected without departing from the spirit and scope of the novel concepts embodied in the disclosure, and in which:

FIG. 5 is a schematic perspective view of a vertical bag forming, filling and sealing apparatus;

FIG. 6 is a transverse sectional elevational view taken substantially along the line VI—VI in FIG. 4;

FIG. 7 is a schematic sectional elevational view taken substantially along the line VII—VII in FIG. 6;

FIG. 8 is a transverse sectional plan view taken substantially along the line VIII—VIII in FIG. 5;

FIG. 9 is a view similar to FIG. 8, but showing a slight modification;

FIG. 10 is another view similar to FIGS. 8 and 9, but showing still another slight modification;

DETAILED DESCRIPTION

Figure 1:
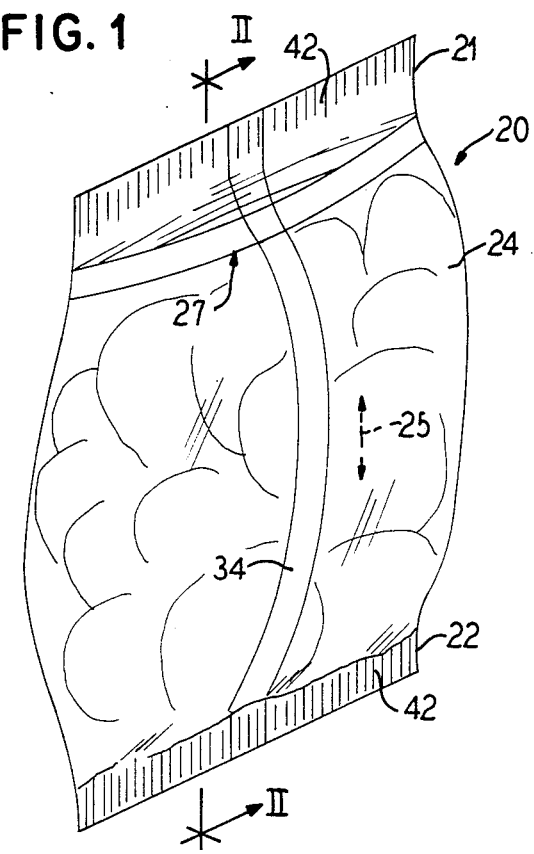
FIG. 1 is a perspective view of a bag embodying features of the invention.
Figure 2:
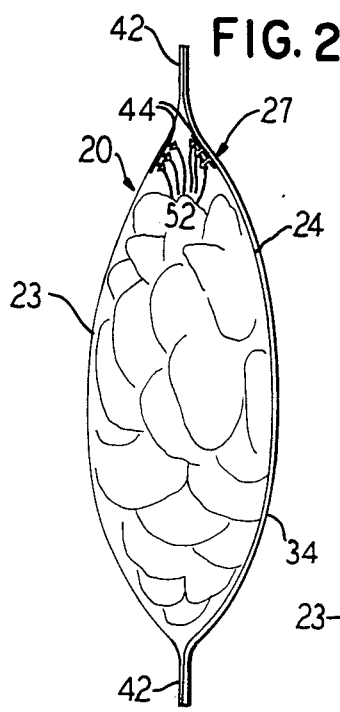
FIG. 2 is a longitudinal sectional view taken substantially along the line II—II in FIG. 1.
Figure 3:
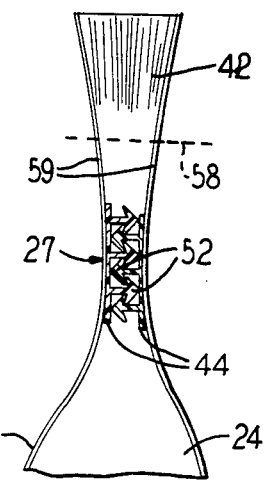
FIG. 3 is an enlarged fragmentary vertical sectional view through the top of the bag of FIG. 1 after it has been opened and the reclosable separable fastener snapped together.

In FIGS. 1–3 is shown a reclosable bag 20 having a body with a top end 21 and a bottom end 22 and confronting walls 23 and 24. The walls 23 and 24 are formed from web material which may, and for some purposes desirably does, have its longitudinal formation axis extending between the top and bottom ends 21 and 22 of the bag body, as indicated by the double ended dashed arrow 25. Elongated, extruded resiliently flexible plastic profiled reclosable fastener strip means 27 secured to the walls 23 and 24 at the top end 21 of the bag body extends across the longitudinal formation axis 25 of the bag body web material.

Any material which will suit the purpose for which the bag 20 is intended may be employed. Thin sheet-form packaging material such as suitable thermoplastic, and if desired gas impervious single layer or laminated extruded film formed from polyethylene, polypropylene, and the like, may be utilized. Such material is adapted to be formed into bags on a continuous production line wherein the material is supplied to bag production apparatus which may or may not be combined with bag filling and sealing means. Generally, because extrusion can be carried out at a much greater speed then most bag making and filling apparatus can utilize the material, the sheet film of whatever character, hereinafter to be generically referred to as web, is rolled into suitable supply rolls since the rolling process can be effected at the same speed as the extrusion and web curing takes place, and then the supply rolls are utilized for supplying bag making web to the bag forming apparatus, which may be combined with means for filling the bags with contents.

Extruded products, and in particular extruded web, regardless of the material from which the web may be extruded, including plastic materials such as polyethylene, polypropylene, and the like, and paper which is generally produced by extruding a paper making fibrous slurry from a nozzle generally identified as a "slice" onto a porous forming belt, have certain telltale characteristic which will identify the formation axis of the web to those skilled in the art. Such telltales may comprise any one or more of molecular orientation, extrusion die markings, guide means markings or slight scratches, grain orientation, and the like, and generally extending along the production or machine direction length of the formed web and herein referred to as "the formation axis".

Bags of the kind exemplified in FIGS. 1–3, are adapted to be made by supplying the desired web material, whether single ply or laminated, to a form, fill and seal machine 28 schematically exemplified in FIG. 5. Such machines are well known in the art and include a combination bag forming and filling nozzle cylinder 29 adapted to receive product to be filled into the formed bags from a hopper 30. Bag making web 31 carrying the reclosable fastener or zipper means 27 extending across the formation axis of the web at suitably longitudinally spaced intervals along the web, is guided as by means of guide roller 32 to the cylindrical outer surface of the cylinder 29.

At the cylinder 29, a folding or wrapping arm device 33 guides and wraps the web 31 about the cylinder 29 with the longitudinal margins of the web brought together into a longitudinal, laminar closure fin assembly 34. Sealing of the fin assembly 34 into a closure seam is effected by means such as a pair of vertical sealing bars 35 which are movable from a spaced clearance relation into clamping and sealing engagement with the closure fin assembly 34, as indicated by the solid directional arrows 37. The bars 35 are then separable as indicated by the dashed arrows 38 to release the heat sealed seam section of fin 34 of the now closed bag forming tube of the web material.

Advancement of the longitudinally sealed tube by bag length increments is effected by means of a pair of horizontal, parallel bag end sealing bars 39 which are reciprocatingly operable, in a manner similar to the fin sealing bars 35, for clampingly engaging the bag web tube below the end of the cylindrical forming and filling nozzle member 29 for simultaneously sealing the top end of a filled bag section 20 and the bottom end of the next succeeding bag section. Then the sealing bars 39 still gripping the bag web tube, move downwardly a bag section length as indicated by the directional arrow 40 to pull and advance the entire bag making tube one bag increment downwardly. As this occurs, the next succeeding bag is filled with product dropped down the cylinder 29 from the hopper 30. As the sealing and pull down bars 39 reach the lower end of their sealing and pulldown stroke, severance means such as a cutoff bar 41 cuts midway across the seal 42 that has been effected by the bars 39, thus releasing the previously filled bag 20 which may then be handled as desired, such as to be packed for market. Having completed its downstroke, the sealing bar and cutoff device 39, 41 returns as indicated by the dashed directional arrow 43 to its starting position adjacent to the lower end of the cylinder 29. It will be understood, of course, that operation of the vertical sealing bars 35, and the horizontal sealing and pulldown bars 39 are operated in coordinated cyclical relation, as is well known in the art for form, fill and seal machines of this type.

One salient aspect of the present invention resides in having the reclosable fastener means 27 extend across the longitudinal formation axis 25 of the web material 31, and so located that as each of the bags 20 is completed, the reclosable sealing means 27 will be at one end, which subsequently may become the top end of the bag body and inside of the top end seal 42 of the bag completed. Through this arrangement, the bags formed in the machine 28 may be of any desired length, within the reciprocal range of the sealing bars 39. On the other hand, the maximum length that has been attainable heretofore was limited by the diameter of the cylinder 29 so that for different bag lengths, different diameter forming cylinders had to be provided. In the prior bags the reclosable fastener extended longitudinally parallel to the longitudinal seam formed by the vertical sealing bars 35, rather than extending parallel to the horizontal sealing and pull down bars 39 as is effected by the present invention which attains great versatility as to the length of bag that may be produced for any given width of bag made on a particular diameter of forming and filling cylinder.

Figure 4:
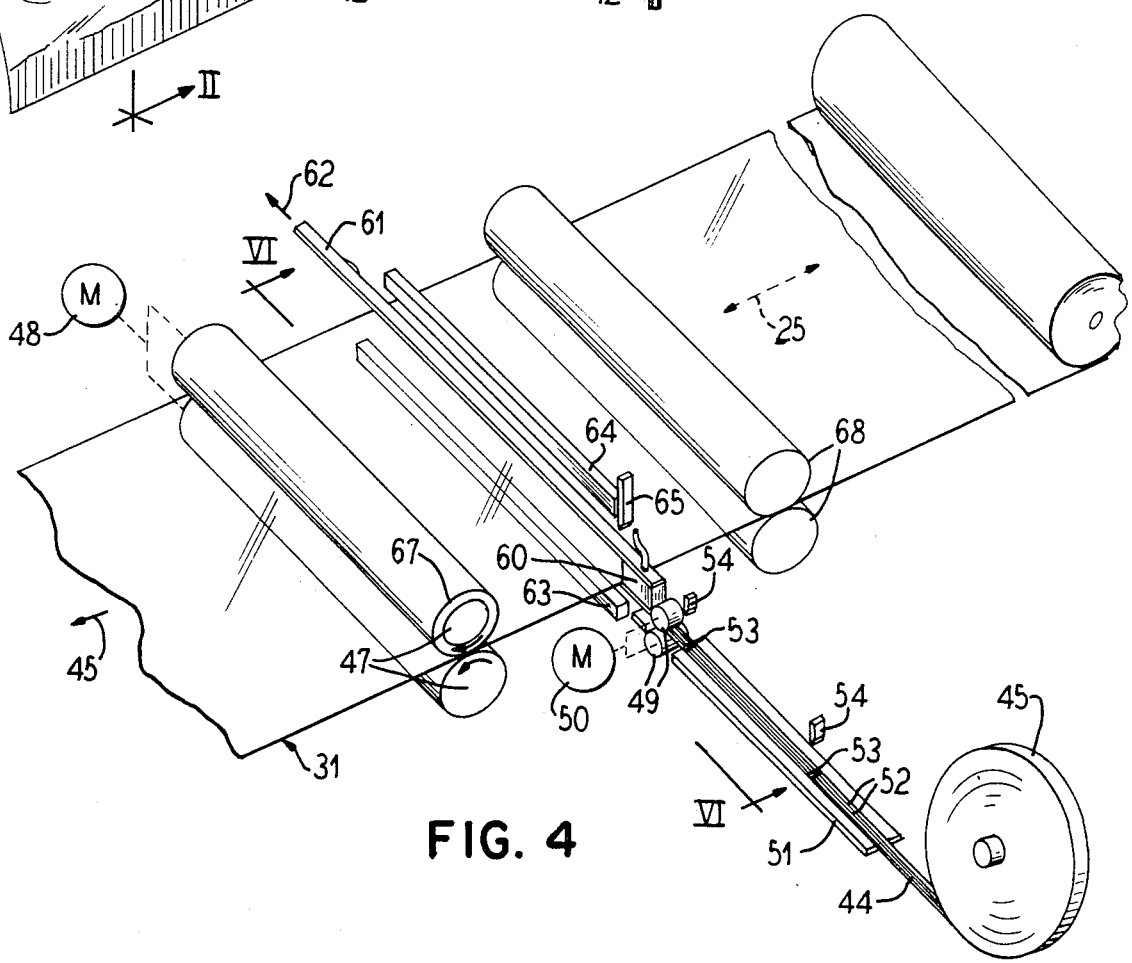
FIG. 4 is a schematic illustration of means for applying preformed extruded plastic profiled reclosable fastener strip means to bag forming web material.

In one preferred arrangement, the fastener means 27 may be secured to the web material 31 in an assembling and securing station upstream adjacent to the form, fill and seal machine 28, as exemplified in FIGS. 4, 6 and 7. Preformed extruded plastic, profiled reclosable fastener strip 44 may be fed from a supply roll 45 to and across and secured to the web 31 which in operation is caused to advance toward the machine 28 as indicated by the directional arrow 45 in FIGS. 4 and 7. Such advance of the web 31 may be effected step-by-step by means of driven pinch feed rolls 47 driven as by means of a motor 48 in coordinated relation with the step-by-step advance of the formed bag tube in the cyclical operation of the machine 28. Coordinated feed of the fastener strip 44 to the web 31 may be effected by means of pinch type feed rolls 49 driven step-by-step as by means of a motor 50 coordinated with operation of the machine 28 and the motor 48.

Upstream from the fastener guide and feed rolls 49, the fastener strip 44 with its base supported on an elongated anvil or pressure bar 51 and with interlockable profiles 52 projecting upwardly, is provided with longitudinally spaced V-notches 53 by the operation of means such as notching tools 54. These tools are located at suitably spaced relation to one another along the length of the fastener strip 44 depending upon the width of the bags to be made from the web 31 after the fastener strip 44 has been secured to the web.

Figure 11:
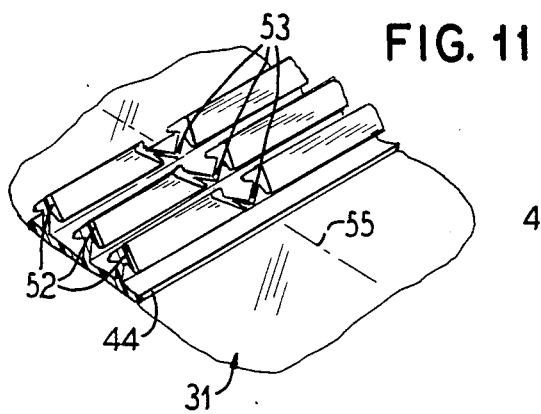
FIG. 11 is an enlarged fragmentary perspective view of the extruded plastic profiled closure fastener strip means as applied to the web and provided with a V-notch to facilitate folding.
Figure 12:
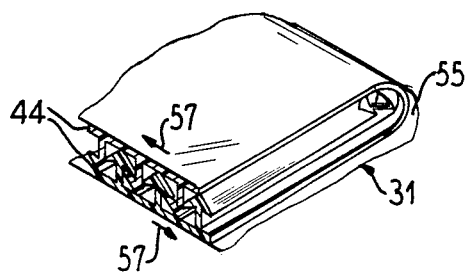
FIG. 12 is a fragmentary sectional perspective view showing the fastener equipped web of FIG. 11 folded and the fastener interlock.

As best visualized in FIGS. 11 and 12, the profiles of the fastener strip 44 are preferably of generally arrow shape in cross section and there are a plurality of the profiles, such as three, extending in spaced parallel relation along the fastener strip 44. The notches 53 extending across the profiles are aligned with fold lines 55 at what will be the closed sides of one of the completed bags 20. The notches 53 facilitate bending or creasing of the base of the fastener strip for interlocking of the fastener profiles 52 by folding over the assembly onto itself as indicated in FIG. 12. Further, the notches 53 facilitate interlocking of the profiles 52 when they are brought into bag closing relation and effect relative lateral adjustment to one another from the axial alignment in which they were formed in the fastener strip. Such lateral adjustment which is minor, but necessary to permit the profiles to interlock on the folded strip, is indicated by the directional arrows 57 in FIG. 12. By having a plurality of the parallel fastener profiles 52, interengagement of the profiles of the folded section is facilitated since critical lateral alignment is not necessary.

In the finished fully sealed bag the profiles 52 may remain separated as shown in FIG. 2 until the top end or mouth of the bag has been opened as shown in FIG. 3 for access to contents in the bag, and then the bag can be closed by interengagement of the fastener profiles as shown in FIG. 3. Opening of the bag may be effected either by pulling the seal 42 at the top end of the bag open, or by severing the top end of the bag along a line 58 between the seal 42 and the reclosable fastener 27 and then using the sidewall portions 59 located outwardly from the fastener 27 as pull flanges for pulling the closed fastener open when desired. Simple digital pressure applied to the folded over portions of the strip 44 of the fastener 27 effects interlocking of the profiles 52.

Returning to FIGS. 4, 6 and 7, sectional lengths of the fastener strip 44 which may be equal to the width of the web 31 are adapted to be guided into position across the web by means comprising a vacuum head 60 carried by a reciprocatable traverse bar 61 by which the vacuum head 60 is caused to extend across the width of the web 31 to bring the vacuum head 60 into position downstream adjacent to the feed rolls 49. These rolls are sufficiently spaced from the adjacent edge of the web 31 to provide for a terminal portion of the fastener strip 44 to be in position in each strip section positioning cycle to be engaged by the vacuum head 60 which is then actuated to shift back across the web 31 as indicated by directional arrow 62 to guide the fastener strip as engaged by the vacuum head 60 into position across the web, as shown in FIG. 6. As thus positioned, the cross-web section of the fastener strip 44 is secured to the web 31 by fusion bonding or adhesive bonding, as may be preferred. For example, where the web 31 and the fastener strip 44 are of a fusion compatible material such as polyethylene, direct fusion bonding may be effected. Where the web 31 and the fastener strip 44 are not fusion compatible, such as where the fastener strip 44 is a polyethylene extrusion and the web 31, or at least the surface of the web to which the fastener strip is to be bonded is polypropylene, the base surface of the fastener strip 44 may carry heat reactivatable adhesive such as a hot melt adhesive. Then, after the section of the fastener strip 44 that has been guided across the web 31 is in position to be bonded to the web 31, a sealing head bar 63 underlying the web 31, in cooperation with a superjacent retaining and pressure bar 64, effects fusion bonding, or reactivates the adhesive carried by the base of the fastener strip, to secure the fastener strip section permanently to the web 31. In coordinated relation with its securement to the web 31 the section of the fastener strip 44 is severed from the strip supply as by means of a cutoff device 65.

After bonding of the notched fastener strip section 44 to the web 31, and which bonding may be effected in a dwell in the advance of the web 31 coordinated with operation of the form, fill and seal machine 28, the sealing bar 63 and the retaining pressure bar 64 are released, and the vacuum head 60 is released, and the web 45 may be advanced a bag length section toward the machine 28. In order to avoid damage to the profiles 52 of the fastener section 44 now bonded to the web 31, as that section passes the feed rolls 47, the roll 47 which engages the fastener strip carrying face of the web 31 may be covered with a relatively soft friction material sleeve 67.

Desirably, at the upstream side of the fastener strip securing means or station, a pair of pinch type guide rolls 68 extend across and uniformly engage the web 31 and in cooperation with the feed rolls 47 at the downstream side of the station maintain a slight stretching tension on the area of the web 31 between the rolls 47 and the rolls 68 to facilitate attainment of optimum results in the fastener strip assembling and bonding steps.

Although as shown in FIGS. 1, 5 and 8, the longitudinal closure seal fin 34 may be located on one wall of the bag 20, in this instance on the wall 24, and onto which the fin may be bent over during the bag end cross sealing effected by the sealing and pull down bars 39, the longitudinal sealing may alternatively be effected along one side of the bag as shown in FIG. 9. For this purpose, the vertical sealing bars 35 are located along what will become one side of the bag and the longitudinal sealing thus effected may be permitted to remain as that side of the bag. In such event, only one V-notch 53 need be scored or cut in each bag section of the fastener strip 44, with such notch located to be at the opposite side of the bag, that is directly opposite the vertical seal fin 34.

On the other hand, if desired, the vertical closure seal for the bag material may be effected by lapping the longitudinal margins of the web into laminar relation generally in the plane of the tubular form into which the web is shaped about the forming and filling nozzle cylinder. To effect such a seal, a technique, substantially as exemplified in U.S. Pat. No. 3,789,888 may be employed wherein a single vertical sealing bar carried by a swing arm may be employed. For this technique, the web margins are wrapped into overlapping relation and each succeeding bag section has the overlapped margins sealed together with the adjacent ends of the fastener strip 44 at the lapped vertical seal along one wall of the bag. Also for this arrangement the dual V-notches 53 are utilized across the fastener profiles.

Figure 13:
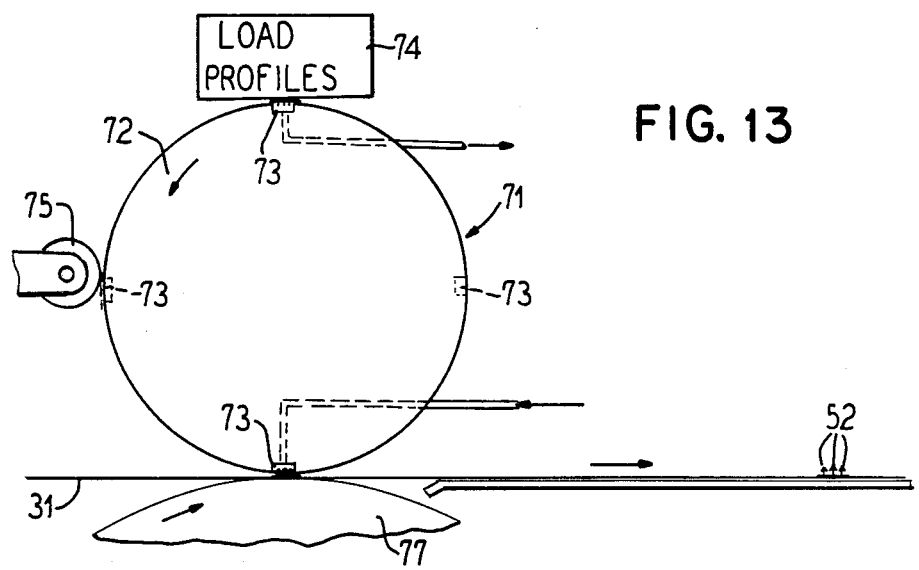
FIG. 13 is a schematic illustration of a modified means for applying the fastener strips across the length of a web.

Instead of the vacuum head and sealing bar applicator arrangement of FIG. 4 for assembling and securing the fastener strip 44 to the web 31, a rotary fastener strip applicator 71 as exemplified in FIG. 13 may be employed. For this purpose, the applicator 71 comprises a rotary drum 72 which is adapted to be rotatably driven in step-by-step coordination with a form, fill and seal apparatus as exemplified in FIG. 5, where it is desired to apply fastener strips 44' to the web 31 at a location adjacent to such a machine. On the other hand, if it is desired to preform a large endless sheet quantity of the bag making web 31 equipped with fastener strip sections 44' secured across the longitudinal forming axis of the web for future use, the applicator drum 72 may be rotated continuously for applying the strip sections 44' to the continuously travelling web at bag length intervals. In any event, the drum 72 is provided at peripherally spaced intervals such as quadrantly with axially extending pockets 73 receptive of the desired length of fastener section 44'. At a loading station, a loader 74 loads the proper length fastener strip section into one of the pockets 73, with the profiles 52 extending inwardly toward the root of the channel-like pocket. A pneumatic means comprising a vacuum source may be applied to the pocket 73 being loaded to assure firm retention of the fastener strip 44' therein. The loaded pocket then moves with rotation of the drum 72 to a heating station where means such as a heating roll 75 heats the exposed base of the fastener strip. Such heating may be simply to preheat the base for direct fusion to the web 31, or it may be for the purpose of reactivating a reactivatable adhesive carried by the base of the strip. From the heating station, the strip is carried on by rotation of the drum 72 for application to the web 31. For this purpose, a heated rotatably driven roll 77 may be provided to underly the web 31 in nipping relation to the drum 72 and the preheated fastener strip is brought into position in the roll nip for bonding to the web 31. At this point, pneumatic expulsion pressure may be applied to the strip carrying pocket 73 to apply a firm uniform bonding pressure to the strip backed up by the roll 77. The bonded fastener strip then leaves the pocket 73, and the pocket advances toward the loading station to be reloaded with another strip 44'.

Figure 14:
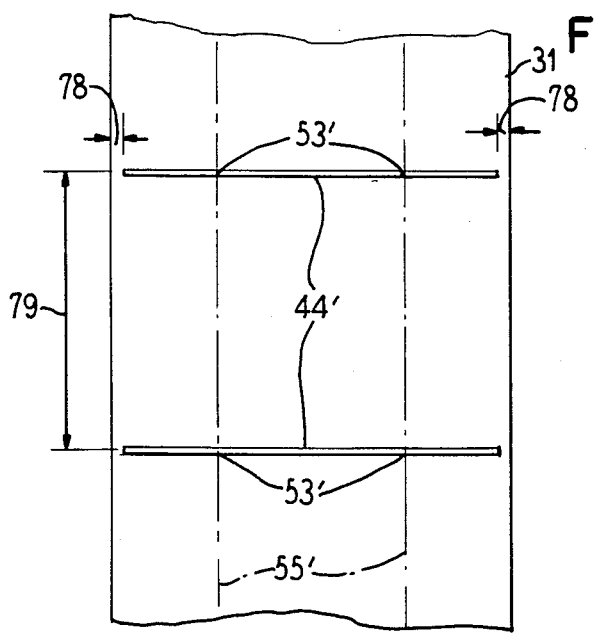
FIG. 14 is a top plan view of a web which has been provided across its formation axis, i.e., its length, with separable fastener strip means by the apparatus of FIG. 13.

An advantage of the rotary applicator 71 is that the fastener strip sections 44' may be of any preferred differential in length relative to the width of the web 31. As shown in FIG. 14, for example, the fastener strip sections 44' may be shorter than the width of the web so as to leave a marginal area 78 along each longitudinal edge of the web between such edge and the adjacent end of the fastener strip 44' in each instance and with the fastener strip sections 44' located at the desired spacing 79 along the length of the web 31. At suitable intervals along the length of each of the fastener strips 44', notches 53' similar to the notches 53 in FIG. 11, are formed across the profiles of the fastener strip to facilitate bending along lines 55' when the bag making material assembly is formed into bags. Since the margins 78 of the material are free along the entire longitudinal length of the web 31, overlapping of such margins during bag formation is facilitated for sealed seam closure, in the manner described in relation to FIG. 10.

Figure 15:
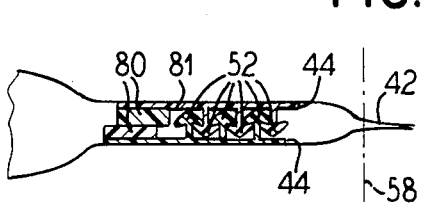
FIG. 15 is a fragmentary sectional detail view showing a reclosable bag top having sealing means associated with the separable fastener.

It will be appreciated, that if instead of having the fastener strip foldable onto themselves as has been described, for example as described in connection with FIGS. 11 and 12, complementary fastener strips may be secured across the formation axes of separate longitudinally extending web sheets or panels and the sheets or panels then brought into face-to-face relation with one another and with the complementary fastener strips aligned for reclosable bag interengagement in the bags made from the material. Equipping the web with the fastener strips at relatively high speed and to continuously running web may be effected by means of the applicator 71.

Where the fastener-carrying web material is fed to a bag making apparatus immediately after securing of the fastener strips thereto, a second rotary applicator may be provided for applying complementary fastener strips to a second running web and the two webs carrying the complementary fastener strips being then joined downstream from the applicators in the bag making process line.

Where it is desired to provide a reclosable fastener bag with bag making material such as represented in FIGS. 11 and 12, but further equipped with means for securing a substantially air tight closure, the arrangement shown in FIG. 15 may be employed wherein the bag material is provided adjacent to the separable fastener, or as part of the separable fastener, with a closed cell elastomer sealing rib 80 folded upon itself together with the associated fastener strip 44 and adapted when the fastener profiles 52 are snapped together to press sealingly together substantially as shown. In one preferred form, the close cell elastomer sealing rib 80 may be applied as a coextrusion onto a flange extension 81 along the side of the strip 44 which will be located at the innerside of the bag.

Figure 16:
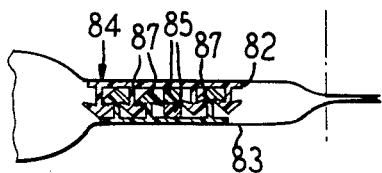
FIG. 16 is a similar view showing a modification of the sealing means and fastener combination.

On the other hand, an air sealing arrangement such as shown in FIG. 16 may be provided wherein complementary profiled fastener strips 82 and 83 may be secured to the mouth end portions of a reclosable bag 84 and with closed cell elastomer sealing strips ribs 85 carried by the fastener strips 82 and 83 in a manner to press against one another in the closed fastener condition of the assembly. In this arrangement, the fastener strip 82 may have four profiles, and the fastener strip 83 may carry three complementary fastener profiles, of generally arrow shape as shown, and which interhook with one another in the closed condition of the fastener. If preferred a rib and groove arrangement for the interlocking fastener profiles such as exemplified in U.S. Pat. No. 3,440,696 may be employed in the arrangement of FIG. 16. It may also be noted that this U.S. Pat. No. 3,440,696 discloses techniques for providing air seal means.

It will be apparent that although placing of the extruded resiliently flexible plastic profile reclosable fastener strips across the longitudinal formation axis of the web greatly facilitates and improves the bag length capability of form, fill and seal machine techniques, and attains the important advantage of being able to utilize single strip reclosable fastener means rather than the conventional dual complementary fastener strip arrangements, the single strip technique may also be utilized for reclosable bags or other products where a foldable closure orientation of the single strip closure means may be advantageous. For this purpose the transversely notched profile arrangement as particularly described in connection with FIGS. 11 and 12 may be utilized, or the fastener strip may be applied to the web in sections derived from the same continuous supply strip and properly aligned so that when the web is folded the fastener strip sections will be in substantially matching, and thoroughly interlockable relation.

Accordingly, it will be appreciated that the present invention provides a new dimension for utilization of extruded resiliently flexible plastic profile reclosable fasteners. In addition, the present invention affords substantial economies where dual complementary fastener strips may be replaced by the single foldable strip technique of the present invention.

It will be understood that variations and modifications may be effected without departing from the spirit and scope of the novel concepts of this invention.

We claim as our invention:

1. A reclosable bag having a body with top and bottom ends and confronting walls, and comprising:
    said walls formed from web material having a longitudinal formation axis extending between said top and bottom ends of the bag body, and the material joined to itself at a joint extending between said top and bottom ends and along one side of the body;
    and a continuous one-piece extruded resiliently flexible plastic profiled reclosable fastener strip extending across said joint and secured to both of said walls at one end of the bag body; and extending lengthwise across said longitudinal formation axis of said web material;
    said reclosable fastener strip being folded upon itself at said joint and having integral therewith interlockable resiliently flexible profiles which are aligned and releasably interlockable with one another in the folded strip.

2. A reclosable bag according to claim 1, wherein said web material has at least one sealed joint along laminar longitudinal margins forming part of at least one of said walls, and said reclosable fastener strip having ends in alignment with one another at said joint.

3. A reclosable bag according to claim 2, wherein said joint extends along said one wall between said top and bottom ends of said bag body and said bag body has folded opposite longitudinal sides, said strip being folded on itself at both of said folded sides.

4. A reclosable bag according to claim 2, wherein said joint extends along one side of said bag body and the opposite side of the bag body comprises said fold in said web material.

5. Material for making a plurality of reclosable bags, comprising:
    an elongated web having a longitudinal formation axis and adapted for forming into bags with the formation axis extending between a top end and a bottom end of each of the bags;
    an extruded continuous one-piece resiliently flexible plastic profiled reclosable separable fastener strip means secured to said material at bag length intervals along the length of the web and extending lengthwise across the width of the web and across said formation axis and located across one of the ends of the bags into which said material is formed and to be foldably aligned on itself for providing a reclosable bag opening.

6. Material according to claim 5, wherein said fastener strip means has opposite ends in alignment with its longitudinal edges of said web.

7. Material according to claim 5, wherein said fastener strip means has opposite ends located in adjacently spaced relation to opposite edges of the web, thereby leaving free margins of the web between said ends and said longitudinal edges.

8. Material according to claim 5, wherein said fastener strip means is foldable upon itself and has interlockable resiliently flexible profiles which are interlockable with one another when the strip means is folded upon itself.

9. A reclosable bag according to claim 1, wherein said reclosable fastener strip includes relatively softer sealing means associated with said fastener strip along the entire length thereof and adapted for compressible sealing engagement in the closed condition of the fastener strip.

10. Material according to claim 5, wherein said fastener strip means has means for facilitating folding of the strip means onto itself at one or more locations along the length of the fastener strip means.

11. Material according to claim 10, wherein said means for facilitating folding comprises one or more notches formed across said strip means.

* * * * *